United States Patent
Givot et al.

(10) Patent No.: US 9,180,573 B2
(45) Date of Patent: Nov. 10, 2015

(54) BONDED ABRASIVE WHEEL

(75) Inventors: Maiken Givot, St. Paul, MN (US); Mark G. Schwabel, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 395 days.

(21) Appl. No.: 13/579,533

(22) PCT Filed: Feb. 22, 2011

(86) PCT No.: PCT/US2011/025696
§ 371 (c)(1), (2), (4) Date: Aug. 16, 2012

(87) PCT Pub. No.: WO2011/109188
PCT Pub. Date: Sep. 9, 2011

(65) Prior Publication Data
US 2013/0203328 A1    Aug. 8, 2013

Related U.S. Application Data

(60) Provisional application No. 61/310,061, filed on Mar. 3, 2010, provisional application No. 61/314,288, filed on Mar. 16, 2010, provisional application No. 61/355,332, filed on Jun. 16, 2010.

(51) Int. Cl.
*B24D 5/12* (2006.01)
*B24D 5/02* (2006.01)
(Continued)

(52) U.S. Cl.
CPC .. *B24D 5/12* (2013.01); *B24D 3/00* (2013.01); *B24D 5/02* (2013.01); *C04B 35/1115* (2013.01);
(Continued)

(58) Field of Classification Search
CPC .............. B24D 5/12; B24D 5/02; B24D 3/00; C09K 3/1409; C04B 35/1115; C04B 35/62886; C04B 35/62892; C04B 2235/3206; C04B 2235/3225; C04B 2235/3227; C04B 2235/3275
USPC ............ 51/293, 295, 296, 297, 298, 307, 309
See application file for complete search history.

(56) References Cited

U.S. PATENT DOCUMENTS

| 1,910,444 A | 5/1933 | Nicholson |
| 3,041,156 A | 6/1962 | Rowse |

(Continued)

FOREIGN PATENT DOCUMENTS

| CA | 743715 | 10/1966 |
| CN | 1748014 A | 3/2006 |

(Continued)

OTHER PUBLICATIONS

Extended European Search Report, 11751072.7 (PCT/US2011/025696), Oct. 22, 2014, 3 pages.
(Continued)

*Primary Examiner* — Lee D Wilson
*Assistant Examiner* — Tyrone V Hall, Jr.
(74) *Attorney, Agent, or Firm* — Branford B. Wright

(57) ABSTRACT

A bonded abrasive wheel comprises ceramic shaped abrasive particles retained in a binder. The ceramic shaped abrasive particles are bounded by a respective base, top and plurality of sides connecting the base and the top. Adjacent sides meet at respective side edges having an average radius of curvature of less than 50 micrometers.

14 Claims, 2 Drawing Sheets

(51) Int. Cl.
*B24D 3/00* (2006.01)
*C09K 3/14* (2006.01)
*C04B 35/111* (2006.01)
*C04B 35/628* (2006.01)

(52) U.S. Cl.
CPC ..... *C04B 35/62813* (2013.01); *C04B 35/62886* (2013.01); *C04B 35/62892* (2013.01); *C09K 3/1409* (2013.01); *C04B 2235/3206* (2013.01); *C04B 2235/3225* (2013.01); *C04B 2235/3227* (2013.01); *C04B 2235/3275* (2013.01)

(56) References Cited

U.S. PATENT DOCUMENTS

| | | | |
|---|---|---|---|
| 3,420,007 A * | 1/1969 | Kolesh | 451/548 |
| 3,657,845 A * | 4/1972 | Sekiya | 451/541 |
| 4,314,827 A | 2/1982 | Leitheiser | |
| 4,623,364 A | 11/1986 | Cottringer et al. | |
| 4,652,275 A | 3/1987 | Bloecher et al. | |
| 4,720,941 A * | 1/1988 | Belieff et al. | 451/540 |
| 4,744,802 A | 5/1988 | Schwabel | |
| 4,770,671 A | 9/1988 | Monroe et al. | |
| 4,799,939 A | 1/1989 | Bloecher et al. | |
| 4,881,951 A | 11/1989 | Monroe et al. | |
| 4,997,461 A | 3/1991 | Markhoff-Matheny et al. | |
| 5,009,675 A | 4/1991 | Kunz et al. | |
| 5,011,508 A | 4/1991 | Wald et al. | |
| 5,042,991 A | 8/1991 | Kunz et al. | |
| 5,085,671 A | 2/1992 | Martin et al. | |
| 5,152,917 A | 10/1992 | Pieper et al. | |
| 5,164,348 A | 11/1992 | Wood | |
| 5,201,916 A | 4/1993 | Berg et al. | |
| 5,213,591 A | 5/1993 | Celikkaya et al. | |
| 5,352,254 A | 10/1994 | Celikkaya | |
| 5,366,523 A | 11/1994 | Rowenhorst et al. | |
| 5,366,526 A | 11/1994 | Ellison-Hayashi | |
| 5,435,816 A | 7/1995 | Spurgeon et al. | |
| 5,551,963 A | 9/1996 | Larmie | |
| 5,584,896 A | 12/1996 | Broberg et al. | |
| RE35,570 E | 7/1997 | Rowenhorst et al. | |
| 5,645,619 A | 7/1997 | Erickson et al. | |
| 5,672,097 A | 9/1997 | Hoopman | |
| 5,840,090 A * | 11/1998 | Ho et al. | 51/295 |
| 5,876,470 A | 3/1999 | Abrahamson | |
| 5,946,991 A | 9/1999 | Hoopman et al. | |
| 5,975,987 A | 11/1999 | Hoopman et al. | |
| 5,984,988 A | 11/1999 | Berg et al. | |
| 6,019,805 A | 2/2000 | Herron | |
| 6,054,093 A | 4/2000 | Torre, Jr. et al. | |
| 6,129,540 A | 10/2000 | Hoopman et al. | |
| 6,277,161 B1 | 8/2001 | Castro | |
| 8,034,137 B2 | 10/2011 | Erickson et al. | |
| 8,123,828 B2 | 2/2012 | Culler et al. | |
| 8,142,531 B2 | 3/2012 | Adefris et al. | |
| 8,142,532 B2 | 3/2012 | Erickson et al. | |
| 8,142,891 B2 * | 3/2012 | Culler et al. | 428/402 |
| 2002/0026752 A1 * | 3/2002 | Culler et al. | 51/298 |
| 2003/0110707 A1 * | 6/2003 | Rosenflanz et al. | 51/307 |
| 2004/0148967 A1 | 8/2004 | Celikkaya | |
| 2009/0165394 A1 * | 7/2009 | Culler et al. | 51/296 |
| 2009/0169816 A1 | 7/2009 | Erickson et al. | |
| 2010/0146867 A1 * | 6/2010 | Boden et al. | 51/309 |
| 2010/0151196 A1 * | 6/2010 | Adefris et al. | 428/142 |
| 2010/0266847 A1 | 10/2010 | Wickert et al. | |
| 2010/0319269 A1 * | 12/2010 | Erickson | 51/295 |
| 2011/0146509 A1 | 6/2011 | Welygan et al. | |
| 2011/0296767 A1 | 12/2011 | Lee et al. | |
| 2012/0137597 A1 | 6/2012 | Adefris et al. | |
| 2012/0144754 A1 | 6/2012 | Culler et al. | |
| 2012/0144755 A1 | 6/2012 | Erickson et al. | |
| 2012/0227333 A1 | 9/2012 | Adefris et al. | |
| 2012/0231711 A1 | 9/2012 | Keipert et al. | |
| 2013/0040537 A1 | 2/2013 | Schwabel et al. | |

FOREIGN PATENT DOCUMENTS

| | | |
|---|---|---|
| CN | 2007-127549 | 11/2007 |
| CN | 101432099 A | 5/2009 |
| EP | 0 656 319 A2 | 6/1995 |
| GB | 986847 | 3/1965 |
| JP | H01-234157 | 9/1989 |
| JP | H06-297337 | 10/1994 |
| JP | 10-179911 | 7/1998 |
| RU | 2124978 C1 | 1/1999 |
| WO | WO 99/38817 A1 | 8/1999 |

OTHER PUBLICATIONS

International Search Report, PCT/US2011/025696, mailed Oct. 10, 2011, 3 pages.

Saint-Gobain Staff, "Investigation of Shaped Abrasive Particles vol. 1: Review of US Pat. No. 6,054,093 Apr. 25, 2000", published Apr. 2011 at http://www.abrasivematerials.saint-gobain.com, 5 pages.

* cited by examiner

BONDED ABRASIVE WHEEL

CROSS-REFERENCE TO RELATED APPLICATIONS

This application is a national stage filing under 35 U.S.C. 371 of PCT/US2011/025696, filed Feb. 22, 2011, which claims priority to U.S. Provisional Application No. 61/310,061, filed Mar. 3, 2010, U.S. Provisional Application No. 61/314,288, filed Mar. 16, 2010, and U.S. Provisional Application No. 61/355,332, filed Jun. 16, 2010, the disclosures of which are incorporated by reference in their entirety herein.

TECHNICAL FIELD

The present disclosure relates to bonded abrasive articles.

BACKGROUND

Bonded abrasive articles have abrasive particles bonded together by a bonding medium. Bonded abrasives include, for example, stones, hones, grinding wheels, and cut-off wheels. The bonding medium is typically an organic resin, but may also be an inorganic material such as a ceramic or glass (i.e., vitreous bonds).

Cut-off wheels are typically thin wheels used for general cutting operations. The wheels are typically about 2 to about 100 centimeters in diameter, and from less than one millimeter (mm) to several mm thick. They are typically operated at speeds of from about 1000 to about 50000 revolutions per minute, and are used for operations such as cutting metal or glass; for example, to a nominal length. Cut-off wheels are also known as "industrial cut-off saw blades" and, in some settings such as foundries, as "chop saws". As their name implies, cut-off wheels are use to cut stock such as, for example, metal rods, by abrading through the stock.

SUMMARY

In one aspect, the present disclosure provides a bonded abrasive comprising ceramic shaped abrasive particles retained in a binder, wherein each of the ceramic shaped abrasive particles is respectively bounded by a polygonal base, a polygonal top, and a plurality of sides connecting the base and the top, wherein adjacent sides meet at respective side edges having an average radius of curvature of less than 50 micrometers, and wherein the bonded abrasive comprises a bonded abrasive wheel.

In some embodiments, the bonded abrasive further comprises crushed abrasive particles having a specified nominal grade. In some embodiments, the crushed abrasive particles are of a finer abrasives industry recognized specified nominal grade than the ceramic shaped abrasive particles.

In some embodiments, the ceramic shaped abrasive particles nominally comprise truncated triangular pyramids. In some embodiments, the ceramic shaped abrasive particles nominally comprise truncated regular triangular pyramids. In some embodiments, the ceramic shaped abrasive particles have a ratio of maximum length to thickness of from 1:1 to 8:1. In some embodiments, the ceramic shaped abrasive particles have a ratio of maximum length to thickness of from 2:1 to 4:1. In some embodiments, each of the sides independently forms a respective dihedral angle with the base in a range of from 75 to 85 degrees.

In some embodiments, the ceramic shaped abrasive particles comprise sol-gel derived alumina abrasive particles. In some embodiments, the ceramic shaped abrasive particles have a coating of inorganic particles thereon.

In some embodiments, the bonded abrasive wheel comprises reinforcing material disposed on opposed major surfaces thereof. In some embodiments, the bonded abrasive wheel has opposed major surfaces, and wherein for a majority of the ceramic shaped abrasive particles, the base is aligned substantially parallel to the opposed major surfaces. In some embodiments, the binder comprises a phenolic resin. In some embodiments, the bonded abrasive wheel comprises a cut-off wheel. In some embodiments, the bonded abrasive wheel comprises a depressed-center grinding wheel (e.g., a Type 26, 27, or 28 depressed-center grinding wheel).

Advantageously, bonded abrasive wheels (e.g., cut-off wheels) according to the present disclosure may exhibit superior cutting performance and/or product longevity during use. Such performance is unexpected inasmuch as that while sharper edges may lead to high initial cut, they would be expected to quickly dull during use.

As used herein, the term "shaped abrasive particle" refers to an abrasive particle with at least a portion of the abrasive particle having a nominal predetermined shape corresponding to a mold cavity used to form a precursor shaped abrasive particle, which is then calcined and sintered to form the shaped abrasive particle. Shaped abrasive particle as used herein excludes abrasive particles obtained by a mechanical crushing operation. As used herein, the term "nominal" means: of, being, or relating to a designated or theoretical size and/or shape that may vary from the actual.

Features and advantages of the present disclosure will be further understood upon consideration of the detailed description and drawings as well as the appended claims.

BRIEF DESCRIPTION OF THE DRAWINGS

While the above-identified drawing figures set forth several embodiments of the present disclosure, other embodiments are also contemplated, as noted in the discussion. The figures may not be drawn to scale. Like reference numbers may have been used throughout the figures to denote like parts.

DETAILED DESCRIPTION

Figure 1:
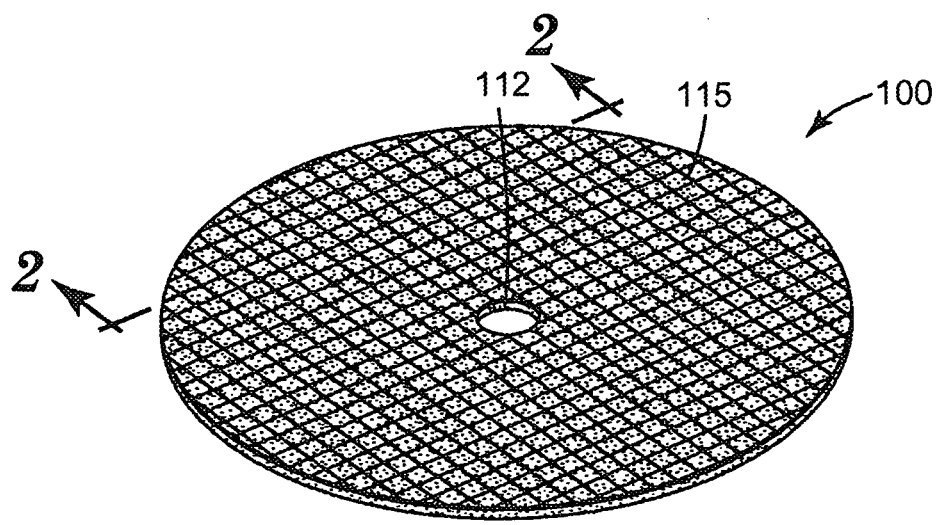
FIG. 1 is a perspective view of an exemplary bonded abrasive cut-off wheel according to one embodiment of the present disclosure.

Referring now to FIG. 1, exemplary bonded abrasive cut-off wheel 100 according to one embodiment of the present disclosure has center hole 112 used for attaching cut-off wheel 100 to, for example, a power driven tool. Cut-off wheel 100 includes ceramic shaped abrasive particles 20, optional conventionally crushed and sized abrasive particles 30, and binder material 25.

Figure 2:
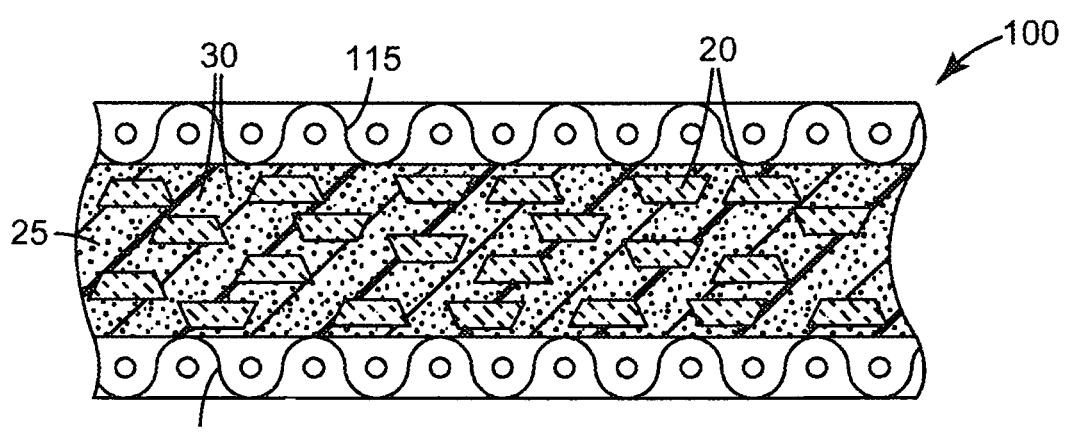
FIG. 2 is a cross-sectional side view of exemplary bonded abrasive cut-off wheel shown in FIG. 1 taken along line 2-2.

FIG. 2 is a cross-section of cut-off wheel 100 of FIG. 1 taken along line 2-2, showing sol-gel alumina based ceramic shaped abrasive particles 20, optional conventionally-crushed abrasive particles 30, and binder material 25. Cut-off wheel 100 has optional first scrim 115 and optional second scrim 116, which are disposed on opposed major surfaces of cut-off wheel 100.

The bonded abrasive wheels according to the present disclosure are generally made by a molding process. During molding, a binder material precursor, either liquid organic, powdered inorganic, powdered organic, or a combination of thereof, is mixed with the abrasive particles. In some instances, a liquid medium (either resin or a solvent) is first applied to the abrasive particles to wet their outer surface, and then the wetted particles are mixed with a powdered medium. Bonded abrasive wheels according to the present disclosure may be made by compression molding, injection molding, transfer molding, or the like. The molding can be done either by hot or cold pressing or any suitable manner known to those skilled in the art.

The binder material typically comprises a glassy inorganic material (e.g., as in the case of vitrified abrasive wheels), metal, or an organic resin (e.g., as in the case of resin-bonded abrasive wheels).

Glassy inorganic binders may be made from a mixture of different metal oxides. Examples of these metal oxide vitreous binders include silica, alumina, calcia, iron oxide, titania, magnesia, sodium oxide, potassium oxide, lithium oxide, manganese oxide, boron oxide, phosphorous oxide, and the like. Specific examples of vitreous binders based upon weight include, for example, 47.61 percent $SiO_2$, 16.65 percent $Al_2O_3$, 0.38 percent $Fe_2O_3$, 0.35 percent $TiO_2$, 1.58 percent CaO, 0.10 percent MgO, 9.63 percent $Na_2O$, 2.86 percent $K_2O$, 1.77 percent $Li_2O$, 19.03 percent $B_2O_3$, 0.02 percent $MnO_2$, and 0.22 percent $P_2O_5$; and 63 percent $SiO_2$, 12 percent $Al_2O_3$, 1.2 percent CaO, 6.3 percent $Na_2O$, 7.5 percent $K_2O$, and 10 percent $B_2O_3$. During manufacture of a vitreous bonded abrasive wheel, the vitreous binder, in a powder form, may be mixed with a temporary binder, typically an organic binder. The vitrified binders may also be formed from a frit, for example anywhere from about one to 100 percent frit, but generally 20 to 100 percent frit. Some examples of common materials used in frit binders include feldspar, borax, quartz, soda ash, zinc oxide, whiting, antimony trioxide, titanium dioxide, sodium silicofluoride, flint, cryolite, boric acid, and combinations thereof. These materials are usually mixed together as powders, fired to fuse the mixture and then the fused mixture is cooled. The cooled mixture is crushed and screened to a very fine powder to then be used as a frit binder. The temperature at which these frit bonds are matured is dependent upon its chemistry, but may range from anywhere from about 600° C. to about 1800° C.

Examples of metal binders include tin, copper, aluminum, nickel, and combinations thereof.

Organic binder materials are typically included in an amount of from 5 to 30 percent, more typically 10 to 25, and more typically 15 to 24 percent by weight, based of the total weight of the bonded abrasive wheel. Phenolic resin is the most commonly used organic binder material, and may be used in both the powder form and liquid state. Although phenolic resins are widely used, it is within the scope of this disclosure to use other organic binder materials including, for example, epoxy resins, urea-formaldehyde resins, rubbers, shellacs, and acrylic binders. The organic binder material may also be modified with other binder materials to improve or alter the properties of the binder material.

Useful phenolic resins include novolac and resole phenolic resins. Novolac phenolic resins are characterized by being acid-catalyzed and having a ratio of formaldehyde to phenol of less than one, typically between 0.5:1 and 0.8:1. Resole phenolic resins are characterized by being alkaline catalyzed and having a ratio of formaldehyde to phenol of greater than or equal to one, typically from 1:1 to 3:1. Novolac and resole phenolic resins may be chemically modified (e.g., by reaction with epoxy compounds), or they may be unmodified. Exemplary acidic catalysts suitable for curing phenolic resins include sulfuric, hydrochloric, phosphoric, oxalic, and p-toluenesulfonic acids. Alkaline catalysts suitable for curing phenolic resins include sodium hydroxide, barium hydroxide, potassium hydroxide, calcium hydroxide, organic amines, or sodium carbonate.

Phenolic resins are well-known and readily available from commercial sources. Examples of commercially available novolac resins include DUREZ 1364, a two-step, powdered phenolic resin (marketed by Durez Corporation of Addison, Tex. under the trade designation VARCUM (e.g., 29302), or HEXION AD5534 RESIN (marketed by Hexion Specialty Chemicals, Inc. of Louisville, Ky.). Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co. of Bartow, Fla. under the trade designation AEROFENE (e.g., AEROFENE 295); and those marketed by Kangnam Chemical Company Ltd. of Seoul, South Korea under the trade designation "PHENOLITE" (e.g., PHENOLITE TD-2207).

Curing temperatures of organic binder material precursors will vary with the material chosen and wheel design. Selection of suitable conditions is within the capability of one of ordinary skill in the art. Exemplary conditions for a phenolic binder may include an applied pressure of about 20 tons per 4 inches diameter (224 $kg/cm^2$) at room temperature followed by heating at temperatures up to about 185° C. for sufficient time to cure the organic binder material precursor.

In some embodiments, the bonded abrasive wheels include from about 10 to 60 percent by weight of ceramic shaped abrasive particles; typically 30 to 60 percent by weight, and more typically 40 to 60 percent by weight, based on the total weight of the binder material and abrasive particles.

Ceramic shaped abrasive particles composed of crystallites of alpha alumina, magnesium alumina spinet, and a rare earth hexagonal aluminate may be prepared using sol-gel precursor alpha alumina particles according to methods described in, for example, U.S. Pat. No. 5,213,591 (Celikkaya et al.) and U.S. Publ. Patent Appl. Nos. 2009/0165394 A1 (Culler et al.) and 2009/0169816 A1 (Erickson et al.).

In some embodiments, alpha alumina based ceramic shaped abrasive particles can be made according to a multi-step process. Briefly, the method comprises the steps of making either a seeded or non-seeded sol-gel alpha alumina precursor dispersion that can be converted into alpha alumina; filling one or more mold cavities having the desired outer shape of the shaped abrasive particle with the sol-gel, drying the sol-gel to form precursor ceramic shaped abrasive particles; removing the precursor ceramic shaped abrasive particles from the mold cavities; calcining the precursor ceramic shaped abrasive particles to form calcined, precursor ceramic shaped abrasive particles, and then sintering the calcined, precursor ceramic shaped abrasive particles to form ceramic shaped abrasive particles. The process will now be described in greater detail.

The first process step involves providing either a seeded or non-seeded dispersion of an alpha alumina precursor that can be converted into alpha alumina. The alpha alumina precursor dispersion often comprises a liquid that is a volatile component. In one embodiment, the volatile component is water. The dispersion should comprise a sufficient amount of liquid for the viscosity of the dispersion to be sufficiently low to enable filling mold cavities and replicating the mold surfaces, but not so much liquid as to cause subsequent removal of the liquid from the mold cavity to be prohibitively expensive. In one embodiment, the alpha alumina precursor dispersion comprises from 2 percent to 90 percent by weight of the particles that can be converted into alpha alumina, such as particles of aluminum oxide monohydrate (boehmite), and at least 10 percent by weight, or from 50 percent to 70 percent, or 50 percent to 60 percent, by weight of the volatile component such as water. Conversely, the alpha alumina precursor dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trade designations "DISPERAL", and "DISPAL", both available from Sasol North America, Inc. of Houston, Tex., or "HiQ-40" available from BASF Corporation of Florham Park, N.J. These aluminum oxide monohydrates are relatively pure; that is, they include relatively little, if any, hydrate phases other than monohydrates, and have a high surface area.

The physical properties of the resulting ceramic shaped abrasive particles will generally depend upon the type of material used in the alpha alumina precursor dispersion. In one embodiment, the alpha alumina precursor dispersion is in a gel state. As used herein, a "gel" is a three dimensional network of solids dispersed in a liquid.

The alpha alumina precursor dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the alpha alumina precursor dispersion can be varied based on skill in the art.

Typically, the introduction of a modifying additive or precursor of a modifying additive will cause the alpha alumina precursor dispersion to gel. The alpha alumina precursor dispersion can also be induced to gel by application of heat over a period of time. The alpha alumina precursor dispersion can also contain a nucleating agent (seeding) to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such alpha alumina precursor dispersions is disclosed in U.S. Pat. No. 4,744,802 (Schwabel).

A peptizing agent can be added to the alpha alumina precursor dispersion to produce a more stable hydrosol or colloidal alpha alumina precursor dispersion. Suitable peptizing agents are monoprotic acids or acid compounds such as acetic acid, hydrochloric acid, formic acid, and nitric acid. Multiprotic acids can also be used but they can rapidly gel the alpha alumina precursor dispersion, making it difficult to handle or to introduce additional components thereto. Some commercial sources of boehmite contain an acid titer (such as absorbed formic or nitric acid) that will assist in forming a stable alpha alumina precursor dispersion.

The alpha alumina precursor dispersion can be formed by any suitable means, such as, for example, by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired. The alpha alumina abrasive particles may contain silica and iron oxide as disclosed in U.S. Pat. No. 5,645,619 (Erickson et al.). The alpha alumina abrasive particles may contain zirconia as disclosed in U.S. Pat. No. 5,551,963 (Larmie). Alternatively, the alpha alumina abrasive particles can have a microstructure or additives as disclosed in U.S. Pat. No. 6,277,161 (Castro).

The second process step involves providing a mold having at least one mold cavity, and preferably a plurality of cavities. The mold can have a generally planar bottom surface and a plurality of mold cavities. The plurality of cavities can be formed in a production tool. The production tool can be a belt, a sheet, a continuous web, a coating roll such as a rotogravure roll, a sleeve mounted on a coating roll, or die. In one embodiment, the production tool comprises polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one embodiment, the entire tooling is made from a polymeric or thermoplastic material. In another embodiment, the surfaces of the tooling in contact with the sol-gel while drying, such as the surfaces of the plurality of cavities, comprises polymeric or thermoplastic materials and other portions of the tooling can be made from other materials. A suitable polymeric coating may be applied to a metal tooling to change its surface tension properties by way of example.

A polymeric or thermoplastic tool can be replicated off a metal master tool. The master tool will have the inverse pattern desired for the production tool. The master tool can be made in the same manner as the production tool. In one embodiment, the master tool is made out of metal, e.g., nickel and is diamond turned. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities can be from an opening in the top surface or bottom surface of the mold. In some instances, the cavities can extend for the entire thickness of the mold. Alternatively, the cavities can extend only for a portion of the thickness of the mold. In one embodiment, the top surface is substantially parallel to bottom surface of the mold with the cavities having a substantially uniform depth. At least one side of the mold, that is, the side in which the cavities are formed, can remain exposed to the surrounding atmosphere during the step in which the volatile component is removed.

The cavities have a specified three-dimensional shape to make the ceramic shaped abrasive particles. The depth dimension is equal to the perpendicular distance from the top surface to the lowermost point on the bottom surface. The depth of a given cavity can be uniform or can vary along its length and/or width. The cavities of a given mold can be of the same shape or of different shapes.

The third process step involves filling the cavities in the mold with the alpha alumina precursor dispersion (e.g., by a conventional technique). In some embodiments, a knife roll coater or vacuum slot die coater can be used. A mold release can be used to aid in removing the particles from the mold if desired. Typical mold release agents include oils such as peanut oil or mineral oil, fish oil, silicones, polytetrafluoroethylene, zinc stearate, and graphite. In general, mold release agent such as peanut oil, in a liquid, such as water or alcohol, is applied to the surfaces of the production tooling in contact with the sol-gel such that between about 0.1 mg/in$^2$ (0.02 mg/cm$^2$) to about 3.0 mg/in$^2$ 0.46 mg/cm$^2$), or between about 0.1 mg/in$^2$ (0.02 mg/cm$^2$) to about 5.0 mg/in$^2$ (0.78 mg/cm$^2$) of the mold release agent is present per unit area of the mold when a mold release is desired. In some embodiments, the top surface of the mold is coated with the alpha alumina precursor dispersion. The alpha alumina precursor dispersion can be pumped onto the top surface.

Next, a scraper or leveler bar can be used to force the alpha alumina precursor dispersion fully into the cavity of the mold. The remaining portion of the alpha alumina precursor dispersion that does not enter cavity can be removed from top surface of the mold and recycled. In some embodiments, a small portion of the alpha alumina precursor dispersion can remain on the top surface and in other embodiments the top surface is substantially free of the dispersion. The pressure applied by the scraper or leveler bar is typically less than 100 psi (0.7 MPa), less than 50 psi (0.3 MPa), or even less than 10 psi (69 kPa). In some embodiments, no exposed surface of the alpha alumina precursor dispersion extends substantially beyond the top surface to ensure uniformity in thickness of the resulting ceramic shaped abrasive particles.

The fourth process step involves removing the volatile component to dry the dispersion. Desirably, the volatile component is removed by fast evaporation rates. In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic. In one embodiment, for a water dispersion of between about 40 to 50 percent solids and a polypropylene mold, the drying temperatures can be between about 90° C. to about 165° C., or between about 105° C. to about 150° C., or between about 105° C. to about 120° C. Higher temperatures can lead to improved production speeds but can also lead to degradation of the polypropylene tooling limiting its useful life as a mold.

The fifth process step involves removing resultant precursor ceramic shaped abrasive particles with from the mold cavities. The precursor ceramic shaped abrasive particles can be removed from the cavities by using the following processes alone or in combination on the mold: gravity, vibration, ultrasonic vibration, vacuum, or pressurized air to remove the particles from the mold cavities.

The precursor abrasive particles can be further dried outside of the mold. If the alpha alumina precursor dispersion is dried to the desired level in the mold, this additional drying step is not necessary. However, in some instances it may be economical to employ this additional drying step to minimize the time that the alpha alumina precursor dispersion resides in the mold. Typically, the precursor ceramic shaped abrasive particles will be dried from 10 to 480 minutes, or from 120 to 400 minutes, at a temperature from 50° C. to 160° C., or at 120° C. to 150° C.

The sixth process step involves calcining the precursor ceramic shaped abrasive particles. During calcining, essentially all the volatile material is removed, and the various components that were present in the alpha alumina precursor dispersion are transformed into metal oxides. The precursor ceramic shaped abrasive particles are generally heated to a temperature from 400° C. to 800° C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor ceramic shaped abrasive particles. Then the precursor ceramic shaped abrasive particles are pre-fired again. This option is further described in U.S. Pat. No. 5,164,348 (Wood).

The seventh process step involves sintering the calcined, precursor ceramic shaped abrasive particles to form alpha alumina particles. Prior to sintering, the calcined, precursor ceramic shaped abrasive particles are not completely densified and thus lack the desired hardness to be used as ceramic shaped abrasive particles. Sintering takes place by heating the calcined, precursor ceramic shaped abrasive particles to a temperature of from 1,000° C. to 1,650° C. and maintaining them within this temperature range until substantially all of the alpha alumina monohydrate (or equivalent) is converted to alpha alumina and the porosity is reduced to less than 15 percent by volume. The length of time to which the calcined, precursor ceramic shaped abrasive particles must be exposed to the sintering temperature to achieve this level of conversion depends upon various factors but usually from five seconds to 48 hours is typical.

In another embodiment, the duration for the sintering step ranges from one minute to 90 minutes. After sintering, the ceramic shaped abrasive particles can have a Vickers hardness of 10 GPa, 16 GPa, 18 GPa, 20 GPa, or greater.

Other steps can be used to modify the described process such as, for example, rapidly heating the material from the calcining temperature to the sintering temperature, centrifuging the alpha alumina precursor dispersion to remove sludge and/or waste. Moreover, the process can be modified by combining two or more of the process steps if desired. Conventional process steps that can be used to modify the process of this disclosure are more fully described in U.S. Pat. No. 4,314,827 (Leitheiser).

More information concerning methods to make ceramic shaped abrasive particles is disclosed in copending U.S. Publ. Patent Appln. No. 2009/0165394 A1 (Culler et al.).

Figure 3A:
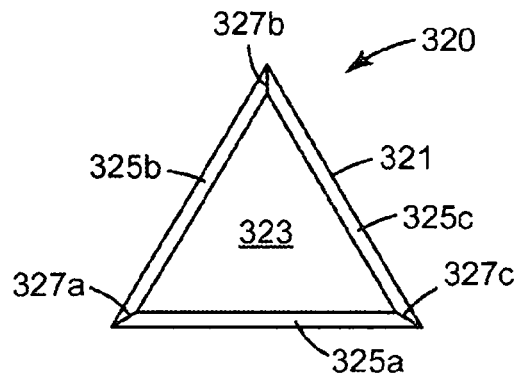
FIG. 3A is a schematic top view of exemplary ceramic shaped abrasive particle 320.
Figure 3B:
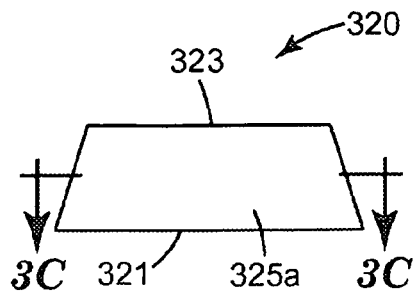
FIG. 3B is a schematic side view of exemplary ceramic shaped abrasive particle 320.
Figure 3C:
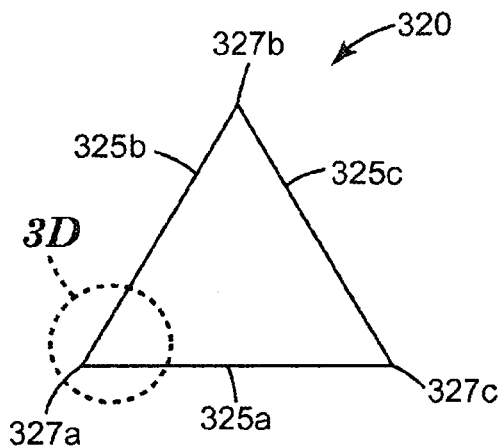
FIG. 3C is a cross-sectional top view of plane 3-3 in FIG. 3B.
Figure 3D:
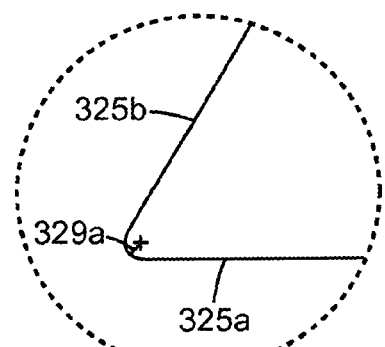
FIG. 3D is an enlarged view of side edge 327a in FIG. 3C.

Referring now to FIGS. 3A-3B, exemplary ceramic shaped abrasive particle 320 is bounded by a trigonal base 321, a trigonal top 323, and plurality of sides 325*a*, 325*b*, 325*c* connecting base 321 and top 323. Base 321 has side edges 327*a*, 327*b*, 327*c*, having an average radius of curvature of less than 50 micrometers. FIGS. 3C-3D show radius of curvature 329a for side edge 327a. In general, the smaller the radius of curvature, the sharper the side edge will be.

The ceramic shaped abrasive particles have a radius of curvature along the side edges connecting the base and top of the ceramic shaped abrasive particles of 50 micrometers or less. The radius of curvature can be measured from a polished cross-section taken between the top and bottom surfaces, for example, using a CLEMEX VISION PE image analysis program available from Clemex Technologies, Inc. of Longueuil, Quebec, Canada, interfaced with an inverted light microscope, or other suitable image analysis software/equipment. The radius of curvature for each point of the shaped abrasive particle can be determined by defining three points at the tip of each point when viewed in cross-section (e.g., at 100× magnification). The first point is placed at the start of the tip's curve where there is a transition from the straight edge to the start of a curve, the second point is located at the apex of the tip, and the third point at the transition from the curved tip back to a straight edge. The image analysis software then draws an arc defined by the three points (start, middle, and end of the curve) and calculates a radius of curvature. The radius of curvature for at least 30 apexes are measured and averaged to determine the average tip radius.

The ceramic shaped abrasive particles used in the present disclosure can typically be made using tools (i.e., molds) cut using diamond tooling, which provides higher feature definition than other fabrication alternatives such as, for example, stamping or punching. Typically, the cavities in the tool surface have planar faces that meet along sharp edges, and form the sides and top of a truncated pyramid. The resultant ceramic shaped abrasive particles have a respective nominal average shape that corresponds to the shape of cavities (e.g., truncated pyramid) in the tool surface; however, variations (e.g., random variations) from the nominal average shape may occur during manufacture, and ceramic shaped abrasive particles exhibiting such variations are included within the definition of ceramic shaped abrasive particles as used herein.

Typically, the base and the top of the ceramic shaped abrasive particles are substantially parallel, resulting in prismatic or truncated pyramidal (as shown in FIGS. 3A-3B) shapes, although this is not a requirement. As shown, sides 325a, 325b, 325c have equal dimensions and form dihedral angles with base 321 of about 82 degrees. However, it will be recognized that other dihedral angles (including 90 degrees) may also be used. For example, the dihedral angle between the base and each of the sides may independently range from 45 to 90 degrees, typically 70 to 90 degrees, more typically 75 to 85 degrees.

As used herein in referring to ceramic shaped abrasive particles, the term "length" refers to the maximum dimension of a shaped abrasive particle. "Width" refers to the maximum dimension of the shaped abrasive particle that is perpendicular to the length. "Thickness" or "height" refer to the dimension of the shaped abrasive particle that is perpendicular to the length and width.

The ceramic shaped abrasive particles are typically selected to have a length in a range of from 0.001 mm to 26 mm, more typically 0.1 mm to 10 mm, and more typically 0.5 mm to 5 mm, although other lengths may also be used. In some embodiments, the length may be expressed as a fraction of the thickness of the bonded abrasive wheel in which it is contained. For example, the shaped abrasive particle may have a length greater than half the thickness of the bonded abrasive wheel. In some embodiments, the length may be greater than the thickness of the bonded abrasive wheel.

The ceramic shaped abrasive particles are typically selected to have a width in a range of from 0.001 mm to 26 mm, more typically 0.1 mm to 10 mm, and more typically 0.5 mm to 5 mm, although other lengths may also be used.

The ceramic shaped abrasive particles are typically selected to have a thickness in a range of from 0.005 mm to 1.6 mm, more typically, from 0.2 to 1.2 mm.

In some embodiments, the ceramic shaped abrasive particles may have an aspect ratio (length to thickness) of at least 2, 3, 4, 5, 6, or more.

Surface coatings on the ceramic shaped abrasive particles may be used to improve the adhesion between the ceramic shaped abrasive particles and a binder material in abrasive articles, or can be used to aid in electrostatic deposition of the ceramic shaped abrasive particles. In one embodiment, surface coatings as described in U.S. Pat. No. 5,352,254 (Celikkaya) in an amount of 0.1 to 2 percent surface coating to shaped abrasive particle weight may be used. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.). Additionally, the surface coating may prevent the shaped abrasive particle from capping. Capping is the term to describe the phenomenon where metal particles from the workpiece being abraded become welded to the tops of the ceramic shaped abrasive particles. Surface coatings to perform the above functions are known to those of skill in the art.

The bonded abrasive wheel may further comprise crushed abrasive particles (i.e., abrasive particles not resulting from breakage of the ceramic shaped abrasive particles and corresponding to an abrasive industry specified nominal graded or combination thereof). The crushed abrasive particles are typically of a finer size grade or grades (e.g., if a plurality of size grades are used) than the ceramic shaped abrasive particles, although this is not a requirement.

Useful crushed abrasive particles include, for example, crushed particles of fused aluminum oxide, heat treated aluminum oxide, white fused aluminum oxide, ceramic aluminum oxide materials such as those commercially available under the trade designation 3M CERAMIC ABRASIVE GRAIN from 3M Company of St. Paul, Minn., black silicon carbide, green silicon carbide, titanium diboride, boron carbide, tungsten carbide, titanium carbide, diamond, cubic boron nitride, garnet, fused alumina zirconia, sol-gel derived abrasive particles, iron oxide, chromia, ceria, zirconia, titania, silicates, tin oxide, silica (such as quartz, glass beads, glass bubbles and glass fibers) silicates (such as talc, clays (e.g., montmorillonite), feldspar, mica, calcium silicate, calcium metasilicate, sodium aluminosilicate, sodium silicate), flint, and emery. Examples of sol-gel derived abrasive particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the abrasive particles could comprise abrasive agglomerates such, for example, as those described in U.S. Pat. No. 4,652,275 (Bloecher et al.) or U.S. Pat. No. 4,799,939 (Bloecher et al.).

Typically, conventional crushed abrasive particles are independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). Such industry accepted grading standards include, for example: ANSI 4, ANSI 6, ANSI 8, ANSI 16, ANSI 24, ANSI 30, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600; FEPA P8, FEPA P12, FEPA P16, FEPA P24, FEPA P30, FEPA P36, FEPA P40, FEPA P50, FEPA P60, FEPA P80, FEPA P100, FEPA P120, FEPA P150, FEPA P180, FEPA P220, FEPA P320, FEPA P400, FEPA P500, FEPA P600, FEPA P800, FEPA P1000, FEPA P1200; FEPA F8, FEPA F12, FEPA F16, and FEPA F24; and JIS 8, JIS 12, JIS 16, JIS 24, JIS 36, JIS 46, JIS 54, JIS 60, JIS 80, JIS 100, JIS 150, JIS 180, JIS 220, JIS 240, JIS 280, JIS 320, JIS 360, JIS 400, JIS 400, JIS 600, JIS 800, JIS 1000, JIS 1500, JIS 2500, JIS 4000, JIS 6000, JIS 8000, and JIS 10,000. More typically, the crushed aluminum oxide particles and the non-seeded sol-gel derived alumina-based abrasive particles are independently sized to ANSI 60 and 80, or FEPA F36, F46, F54 and F60 or FEPA P60 and P80 grading standards.

Alternatively, ceramic shaped abrasive particles can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the ceramic shaped abrasive particles pass through a test sieve meeting ASTM E-11 specifications for the number 18 sieve and are retained on a test sieve meeting ASTM E-11 specifications for the number 20 sieve. In one embodiment, the ceramic shaped abrasive particles have a particle size such that most of the particles pass through an 18 mesh test sieve and can be retained on a 20, 25, 30, 35, 40, 45, or 50 mesh test sieve. In various embodiments, the ceramic shaped abrasive particles can have a nominal screened grade comprising: −18+20, −20/+25, −25+30, −30+35, −35+40, 5−40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100.

The abrasive particles may, for example, be uniformly or non-uniformly distributed throughout the bonded abrasive article. For example, if the bonded abrasive wheel is a grinding wheel or a cut-off wheel, the abrasive particles may be concentrated toward the middle (e.g., located away from the outer faces of a grinding or cut-off wheel), or only in the outer edge, i.e., the periphery, of a grinding or cut-off wheel. The depressed-center portion may contain a lesser amount of abrasive particles. In another variation, first abrasive particles may be in one side of the wheel with different abrasive particles on the opposite side. However, typically all the abrasive particles are homogenously distributed among each other, because the manufacture of the wheels is easier, and the cutting effect is optimized when the two types of abrasive particles are closely positioned to each other.

Bonded abrasive wheels according to the present disclosure may comprise additional abrasive particles beyond those mentioned above, subject to weight range requirements of the other constituents being met. Examples include fused aluminum oxide (including fused alumina-zirconia), brown aluminum oxide, blue aluminum oxide, silicon carbide (including green silicon carbide), garnet, diamond, cubic boron nitride, boron carbide, chromia, ceria, and combinations thereof.

In some embodiments, the abrasive particles are treated with a coupling agent (e.g., an organosilane coupling agent) to enhance adhesion of the abrasive particles to the binder. The abrasive particles may be treated before combining them with the binder material, or they may be surface treated in situ by including a coupling agent to the binder material.

In some embodiments, bonded abrasive wheels according to the present disclosure contain additional grinding aids such as, for example, polytetrafluoroethylene particles, cryolite, sodium chloride, $FeS_2$ (iron disulfide), or $KBF_4$; typically in amounts of from 1 to 25 percent by weight, more typically 10 to 20 percent by weight, subject to weight range requirements of the other constituents being met. Grinding aids are added to improve the cutting characteristics of the cut-off wheel, generally by reducing the temperature of the cutting interface. The grinding aid may be in the form of single particles or an agglomerate of grinding aid particles. Examples of precisely shaped grinding aid particles are taught in U.S. Patent Publ. No. 2002/0026752 A1 (Culler et al.).

In some embodiments, the binder material contains plasticizer such as, for example, that available as SANTICIZER 154 PLASTICIZER from UNIVAR USA, Inc. of Chicago, Ill.

Bonded abrasive wheels according to the present disclosure may contain additional components such as, for example, filler particles, subject to weight range requirements of the other constituents being met. Filler particles may be added to occupy space and/or provide porosity. Porosity enables the bonded abrasive wheel to shed used or worn abrasive particles to expose new or fresh abrasive particles.

Bonded abrasive wheels according to the present disclosure have any range of porosity; for example, from about 1 percent to 50 percent, typically 1 percent to 40 percent by volume. Examples of fillers include bubbles and beads (e.g., glass, ceramic (alumina), clay, polymeric, metal), cork, gypsum, marble, limestone, flint, silica, aluminum silicate, and combinations thereof.

Bonded abrasive wheels according to the present disclosure can be made according to any suitable method. In one suitable method, the non-seeded sol-gel derived alumina-based abrasive particles are coated with a coupling agent prior to mixing with the curable resole phenolic. The amount of coupling agent is generally selected such that it is present in an amount of 0.1 to 0.3 parts for every 50 to 84 parts of abrasive particles, although amounts outside this range may also be used. To the resulting mixture is added the liquid resin, as well as the curable novolac phenolic resin and the cryolite. The mixture is pressed into a mold (e.g., at an applied pressure of 20 tons per 4 inches diameter (224 $kg/cm^2$) at room temperature. The molded wheel is then cured by heating at temperatures up to about 185° C. for sufficient time to cure the curable phenolic resins.

Coupling agents are well-known to those of skill in the abrasive arts. Examples of coupling agents include trialkoxysilanes (e.g., gamma-aminopropyltriethoxysilane), titanates, and zirconates.

Bonded abrasive wheels according to the present disclosure are useful, for example, as cut-off wheels and abrasives industry Type 27 (e.g., as in American National Standards Institute standard ANSI B7.1-2000 (2000) in section 1.4.14) depressed-center grinding wheels.

Cut-off wheels are typically 0.80 millimeter (mm) to 16 mm in thickness, more typically 1 mm to 8 mm, and typically have a diameter between 2.5 cm and 100 cm (40 inches), more typically between about 7 cm and 13 cm, although other dimensions may also be used (e.g., wheels as large as 100 cm in diameter are known). An optional center hole may be used to attaching the cut-off wheel to a power driven tool. If present, the center hole is typically 0.5 cm to 2.5 cm in diameter, although other sizes may be used. The optional center hole may be reinforced; for example, by a metal flange. Alternatively, a mechanical fastener may be axially secured to one surface of the cut-off wheel. Examples include threaded posts, threaded nuts, Tinnerman nuts, and bayonet mount posts.

Figure 4:
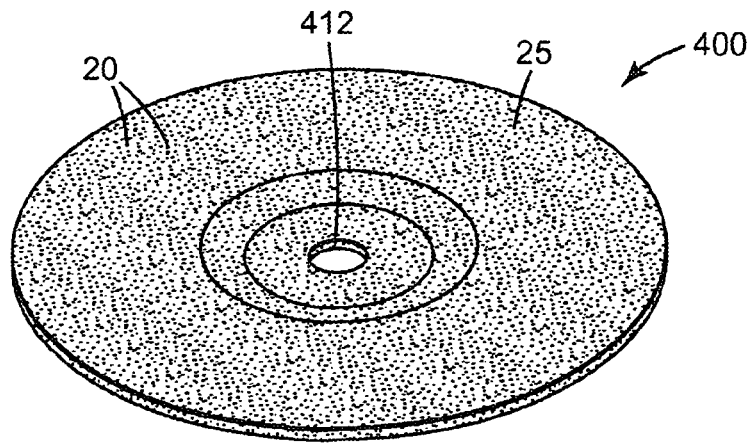
FIG. 4 is a perspective view of an exemplary depressed-center grinding wheel according to one embodiment of the present disclosure.

FIG. 4 shows an exemplary embodiment of a Type 27 depressed-center grinding wheel 400 according to one embodiment of the present disclosure. Center hole 412 is used for attaching Type 27 depressed-center grinding wheel 400 to, for example, a power driven tool. Type 27 depressed-center grinding wheel 400 comprises ceramic shaped abrasive particles 20 and binder material 25.

Optionally, bonded abrasive wheels, and especially cut-off wheels, according to the present disclosure may further comprise a scrim that reinforces the bonded abrasive wheel; for example, disposed on one or two major surfaces of the bonded abrasive wheel, or disposed within the bonded abrasive wheel. Examples of scrims include a woven or a knitted cloth. The fibers in the scrim may be made from glass fibers (e.g., fiberglass), organic fibers such as polyamide, polyester, or polyimide. In some instances, it may be desirable to include reinforcing staple fibers within the bonding medium, so that the fibers are homogeneously dispersed throughout the cut-off wheel.

Bonded abrasive wheels according to the present disclosure are useful, for example, for abrading a workpiece. For example, they may be formed into grinding or cut-off wheels that exhibit good grinding characteristics while maintaining a relatively low operating temperature that may avoid thermal damage to the workpiece.

Cut-off wheels can be used on any right angle grinding tool such as, for example, those available from Ingersoll-Rand, Sioux, Milwaukee, and Dotco. The tool can be electrically or pneumatically driven, generally at speeds from about 1000 to 50000 RPM.

During use, the bonded abrasive wheel can be used dry or wet. During wet grinding, the wheel is used in conjunction with water, oil-based lubricants, or water-based lubricants. Bonded abrasive wheels according to the present disclosure may be particularly useful on various workpiece materials such as, for example, carbon steel sheet or bar stock and more exotic metals (e.g., stainless steel or titanium), or on softer more ferrous metals (e.g., mild steel, low alloy steels, or cast irons).

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Materials Used in the Examples

TABLE 1

| ABBREVIATION | DESCRIPTION |
| --- | --- |
| SAL0 | right triangular prism-shaped sol-gel derived alumina based abrasive particles prepared according to the method of U.S. Pat. No. RE35570 (Rowenhorst et al.) |
| SAL1 | triangular sol-gel derived alumina based abrasive particles molded as indicated in Table 2 (below) from a mold having a length:thickness ratio of 3:1 |
| SAL2 | triangular sol-gel derived alumina based abrasive particles molded as indicated in Table 2 (below) |
| SAL3 | triangular sol-gel derived alumina based abrasive particles molded as indicated in Table 2 from a mold having a length:thickness ratio of 6:1 |
| SAL4 | triangular sol-gel derived alumina based abrasive particles molded as indicated in Table 2 from a mold having a length:thickness ratio of 3:1 |
| SAL5 | triangular sol-gel derived alumina based abrasive particles molded as indicated in Table 2 from a mold having a length:thickness ratio of 6:1 |
| SAL6 | triangular sol-gel derived alumina based abrasive particles molded as indicated in Table 2 from a mold having a length:thickness ratio of 4:1 |
| SAL0(S) | Silane treated SAL0 |
| SAL1(S) | Silane treated SAL1 |
| SAL2(S) | Silane treated SAL2 |
| SAL3(S) | Silane treated SAL3 |
| AL0 | A mixture of 50 parts AL1 and 50 parts of AL2 |
| AL1 | ANSI 40 grade (400 micrometers mean particle diameter) non-seeded sol-gel derived alumina based abrasive particles obtained as CUBITRON 321 from 3M Company of St. Paul, Minnesota |
| AL2 | ANSI 50 grade (300 micrometers mean particle diameter) non-seeded sol-gel derived alumina based abrasive particles obtained as CUBITRON 324AV from 3M Company |
| AL3 | ANSI 60 grade (250 micrometers mean particle diameter) seeded sol-gel derived alumina based abrasive particles obtained as CUBITRON 222 from 3M Company |
| AL4 | ANSI 80 grade (177 micrometers mean particle diameter) seeded sol-gel derived alumina based abrasive particles obtained as CUBITRON 222 from 3M Company |
| AL5 | a mixture of 34% F24 95A fused alumina (PHU Sumika, Lublin, Poland), 42% F30 95A Brown fused alumina (PHU Sumika), 10% F36 97A FRSK (Treibacher Schleifmittel GmbH of Villach, Austria), and 14% F46 99A White fused alumina (Stanchem Co., Ltd. of Lublin, Poland) |

TABLE 1-continued

| ABBREVIATION | DESCRIPTION |
| --- | --- |
| CA | Amino functional silane coupling agent, obtained as SILQUEST A1100 from Momentive Performance Materials of Albany, New York |
| CRY | Synthetic cryolite ($Na_3AlF_6$), obtained as RTN CRYOLITE from TR International Trading Co. of Houston, Texas |
| PR1 | A one-step liquid phenolic resin, obtained as VARCUM 29353 from Durez Corp. of Addison, Texas |
| PR2 | A two-step, powdered phenolic resin, obtained as VARCUM 29302 from Durez Corp. |
| PR3 | A powdered phenolic resin, obtained as AD5534 Resin from Hexion Specialty Chemicals of Columbus, Ohio |
| SR | SANTICIZER 154 plasticizer made by Ferro Corporation and obtained from UNIVAR USA, Inc. of Chicago, Illinois |
| APR | Adhesion promoter obtained as B515.71W CHARTWELL II from Chartwell International, Inc. of North Attleboro, Massachusetts |
| SM | 4-inch diameter fiberglass scrim discs, obtained as 3321 from Industrial Polymers & Chemicals of Shrewsbury, Massachusetts |
| WG | sodium silicate, obtained as "N" from PQ Corporation of Valley Forge, Pennsylvania |

Description of Molds Used to Make Ceramic Shaped Abrasive Particles

SAL1, SAL 3, SAL4 and SAL5: The mold had close-packed shaped triangular cavities with equal length of all three sides. The side length of the mold cavities used to make SAL1, SAL3, SAL4 and SAL5 was 2.79 mm (110 mils). For SAL1 and SAL4, the mold was manufactured such that the mold cavities had parallel ridges rising from the bottom surfaces of the cavities that intersected with one side of the triangle at a 90 degree angle. The parallel ridges were spaced 0.277 mm (10.9 mils) apart, and the cross-section of the ridges was a triangle shape having a height of 0.0127 mm (0.5 mils) and a 45 degree angle between the sides of each ridge at the tip. For SAL1 and SAL4, the side wall depth was 0.91 mm (36 mils). For SAL3 and SAL5, the mold was manufactured such that the mold cavities had parallel ridges protruding into the bottom surfaces of the mold cavities that intersected with one side of the triangle at a 90 degree angle. The parallel ridges were spaced 0.10 mm (3.9 mils) apart, and the cross-section of the ridges was a triangle shape having a height of 0.0032 mm (0.126 mils) and a 45 degree angle between the sides of each ridge at the tip. For SAL3 and SAL5, the side wall depth was 0.46 mm (18 mils).

SAL2: The side length of the mold cavities used to make SAL2 was 1.66 mm (65 mils). The side wall depth was 0.80 mm (31 mils). The mold cavities had parallel ridges rising from the bottom that intersected with one side of the triangle at a 90 degree angle. The parallel ridges were spaced 0.150 mm (5.9 mils) apart, and the cross-section of the ridges was a triangle shape having a height of 0.0127 mm (0.5 mil) and a 30 degree angle between the sides of each ridge at the tip.

For SAL1-SAL5 the slope angle (i.e., the dihedral angle formed between the bottom of the cavity (corresponding to the top of the shaped abrasive particle) and each sidewall) was 98 degrees.

Preparation of Comparative Ceramic Shaped Abrasive Particles (SAL0)

Ceramic shaped abrasive particles were made according to the procedure disclosed in U.S. Pat. No. 5,366,523 (Rowenhorst et al.). An alpha alumina precursor dispersion (44 percent solids) was made by the following procedure: aluminum monohydrate powder (1235 parts) available as DISPERAL from Sasol North America, Inc. of Houston, Tex., was dispersed by continuously mixing a solution containing water (3026 parts) and 70 percent aqueous nitric acid (71 parts). The sol that resulted was dried at a temperature of approximately 125° C. in a continuous dryer to produce a 44 percent solids alpha alumina precursor dispersion. The alpha alumina precursor dispersion was introduced into triangular shaped mold cavities by means of a rubber squeegee. The cavities were coated with a silicone release material prior to introduction of the alpha alumina precursor dispersion. The mold was an aluminum sheet containing multiple equilateral triangle-shaped holes that were punched through the aluminum sheet. The sizes of the triangular-shaped holes were 28 mils (0.71 mm) depth and 110 mils (2.79 mm) on each side. The filled mold was place in a forced air oven maintained at a temperature of 71° C. for 20 minutes. The alpha alumina precursor dispersion underwent substantial shrinkage as it dried, and the precursor ceramic shaped abrasive particles shrank within the cavities. The precursor ceramic shaped abrasive particles were removed from the mold by gravity and dried at a temperature of 121° C. for three hours.

The precursor ceramic shaped abrasive particles were calcined at approximately 650° C. and then saturated with a mixed nitrate solution of MgO, $Y_2O_3$, CoO and $La_2O_3$. The excess nitrate solution was removed and the saturated precursor ceramic shaped abrasive particles were allowed to dry after which the precursor ceramic shaped abrasive particles were again calcined at 650° C. and sintered at approximately 1400° C. to produce ceramic shaped abrasive particles. Both the calcining and sintering were carried out using rotary tube kilns. The resulting composition was an alumina composition containing 1.2 weight percent MgO, 1.2 weight percent $Y_2O_3$, 2.4 weight percent $La_2O_3$, and traces of $TiO_2$, $SiO_2$, CaO, and CoO and Fe.

Preparation of REO-Doped Ceramic Shaped Abrasive Particles (SAL1, SAL2, SAL3, and SAL6)

A sample of boehmite sol-gel was made using the following recipe: aluminum oxide monohydrate powder (1600 parts) available as DISPERAL from Sasol North America, Inc. was dispersed by high shear mixing a solution containing water (2400 parts) and 70 aqueous nitric acid (72 parts) for 11 minutes. The resulting sol-gel was aged for at least 1 hour before coating. The sol-gel was forced into production tooling having triangular shaped mold cavities of dimensions reported above.

The sol-gel was forced into the cavities with a putty knife so that the openings of the production tooling were completely filled. A mold release agent, 1 percent peanut oil in methanol was used to coat the production tooling with about 0.5 mg/in² (0.08 mg/cm²) of peanut oil applied to the production tooling. The excess methanol was removed by placing sheets of the production tooling in an air convection oven for 5 minutes at 45° C. The sol-gel coated production tooling was placed in an air convection oven at 45° C. for at least 45 minutes to dry. The precursor ceramic shaped abrasive particles were removed from the production tooling by passing it over an ultrasonic horn. The precursor ceramic shaped abrasive particles were calcined at approximately 650° C. and then saturated with a with a mixed nitrate solution of MgO, $Y_2O_3$, CoO and $La_2O_3$. The excess nitrate solution was removed and the saturated precursor ceramic shaped abrasive particles with openings were allowed to dry after which the particles were again calcined at 650° C. and sintered at approximately 1400° C. Both the calcining and sintering were carried out using rotary tube kilns. The resulting composition was an alumina composition containing 1 weight percent MgO, 1.2 weight percent of $Y_2O_3$, 4 weight percent of $La_2O_3$ and 0.05 weight percent of CoO, with traces of $TiO_2$, $SiO_2$, and CaO.

Preparation of REO-Doped Ceramic Shaped Abrasive Particles (SAL4 and SAL5)

Ceramic shaped abrasive particles SAL4 and SAL5 were prepared identically to those of SAL1 with the exception that the resulting particles were alumina compositions containing 1.2 weight percent of MgO, 1.2 weight percent of $Y_2O_3$, 2.4 weight percent of $La_2O_3$, and traces of $TiO_2$, $SiO_2$, CaO, and CoO and Fe.

Surface Coating Treatment (SAL1, SAL2, SAL3, and SAL6)

Some of the ceramic shaped abrasive particles were treated to enhance electrostatic application of the ceramic shaped abrasive particles in a manner similar to the method used to make crushed abrasive particles as disclosed in U.S. Pat. No. 5,352,254 (Celikkaya). The calcined, precursor ceramic shaped abrasive particles were impregnated with an alternative rare earth oxide (REO) solution comprising 1.4 percent MgO, 1.7 percent $Y_2O_3$, 5.7 percent $La_2O_3$ and 0.07 percent CoO. Into 70 grams of the REO solution, 1.4 grams of HYDRAL COAT 5 powder available from Almatis of Pittsburgh, Pa. (approximately 0.5 micron mean particle size) is dispersed by stirring it in an open beaker. About 100 grams of calcined, precursor ceramic shaped abrasive particles is then impregnated with the 71.4 grams of the HYDRAL COAT 5 powder dispersion in REO solution. The impregnated, calcined, precursor ceramic shaped abrasive particles were then calcined again before sintering to final hardness.

Abrasive particle dimensions are reported in Table 2 (below)

TABLE 2

| PARTICLE | SHAPE | APPROXIMATE. MESH SIZE | AVERAGE PARTICLE LENGTH, mm, (standard deviation) | AVERAGE PARTICLE THICKNESS, mm, (standard deviation) | AVERAGE PARTICLE ASPECT RATIO, length/thickness | AVERAGE RADIUS OF CURVATURE OF ABRASIVE PARTICLE SIDE EDGES, micrometers, (standard deviation) | MOLD DIMENSIONS LENGTH × HEIGHT, mm, SLOPE ANGLE |
|---|---|---|---|---|---|---|---|
| SAL0 | regular triangular prism | 12 | 1.421 (0.087) | 0.323 (0.034) | 4.4 | 134 (31) | 2.79 × 0.71, ~90° |
| SAL1 | regular truncated triangular pyramid | 12 | 1.383 (0.063) | 0.305 (0.081) | 4.5 | 13.71 (9.15) | 2.79 × 0.91, 98° |
| SAL2 | regular truncated triangular pyramid | 20 | 0.765 (0.064) | 0.258 (0.058) | 3.0 | 8.01 (3.85) | 1.66 × 0.80, 98° |
| SAL3 | regular truncated triangular pyramid | 12 | 1.447 (0.044) | 0.164 (0.033) | 8.8 | 22.74 (13.29) | 2.79 × 0.46, 98° |
| SAL4 | regular truncated triangular pyramid | 12 | 1.293 (0.053) | 0.329 (0.061) | 3.9 | 20.53 (5.25) | 2.79 × 0.91, 98° |
| SAL5 | regular truncated triangular pyramid | 12 | 1.423 (0.085) | 0.180 (0.030) | 7.9 | 19.82 (4.22) | 2.79 × 0.46, 98° |
| SAL6 | regular truncated triangular pyramid | 12 | 1.384 (0.055) | 0.229 (0.026) | 6.0 | 12.71 (7.44) | 2.79 × 0.762, 98° |

Technique for Measuring Radius of Curvature

The radius of curvature for all samples was determined according to the following method: The ceramic shaped abrasive particles have a radius of curvature along the side edges connecting the base and top of the ceramic shaped abrasive particles of 50 micrometers or less. The radius of curvature was measured from a polished cross-section taken between the top and bottom surfaces, for example, using a CLEMEX VISION PE image analysis program available from Clemex Technologies, Inc. of Longueuil, Quebec, Canada, interfaced with an inverted light microscope, or other suitable image analysis software/equipment. The radius of curvature for each point of the shaped abrasive particle was determined by defining three points at the tip of each point when viewed in cross-section (e.g., at 100× magnification). The first point was placed at the start of the tip's curve where there is a transition from the straight edge to the start of a curve, the second point was located at the apex of the tip, and the third point at the transition from the curved tip back to a straight edge. The image analysis software then draws an arc defined by the three points (start, middle, and end of the curve) and calculates a radius of curvature. The radius of curvature for at least 30 apexes are measured and averaged to determine the average tip radius.

Technique for Measuring Particle Length

The dimensions of the final particles were measured using a commercially available "AM413ZT DINO-LITE PRO" digital microscope, obtained from www.BigC.com of Torrence, Calif. Five particles of each batch were laid flat, and an image was taken at 100× magnification. The lengths of all three sides of each particle were measured using the built-in computer software of the digital camera. The average of those 15 length measurements was calculated, as well as the standard deviation.

Technique for Measuring Particle Thickness

The dimensions of the final particles were measured using a commercially available "AM413ZT DINO-LITE PRO" digital microscope, available from www.BigC.com of Torrence, Calif. The average particle thickness was determined by mounting five particles of each type sideways (the flat sides being perpendicular to the table surface) and taking images of the particle sides at 100× magnification. The particle thickness of the center and close to each edge was measured for each side, using the cursor of the provided software. The particles were then rotated 120 degrees perpendicular to the table surface, and three height measurements were taken of the second and third side, respectively. Thus, 9 particle thickness measurements were taken of each sample, a total of 45 measurements for 5 particles. The average and standard deviation were calculated.

Examples 1-3 and Comparative Examples A-B

For Example 1, 54.35 parts of SAL1, 4.7 percent of AL3 and 3.1 percent of AL4 were mixed with 5.5 parts of PR1 using a paddle mixer. Meanwhile 17.25 parts of PR2, 15.1 parts of CRY were mixed together. The dry powder mixture was slowly added to the wet mixture of resin and abrasive particles, and was tumbled. SR (1.1 parts) was added to that mix. The mixed composition was sieved through a 16 mesh screen to remove any large sized resin-coated agglomerates. A 4-inch (105-mm) diameter glass fiber scrim (SM) obtained as 3321 from Industrial Polymers & Chemicals of Shrewsbury, Mass.) was placed into the mold of a hydraulic press machine. After sieving the mix through a 16 mesh screen, 20 g of the mineral/resin mix was placed into the mold of a hydraulic press machine, on top of the scrim. A second scrim was placed on top of the mix composition, and pressed in a single cavity press at a pressure of 20 tons/12.27 inch$^2$ (230 kg/cm$^2$). The cut-off wheels were then placed between metal plates, separated by TEFLON coated sheets, and placed in a curing oven. After a curing cycle of about 40 hours (Segment 1: set point 174° F. (78.8° C.), ramp up over 4 minutes, soak for 7 hours; Segment 2: set point 225° F. (107° C.), ramp up over 4 hours 20 minutes, soak for 3 hours; Segment 3: set point 365° F. (185° C.), ramp up over 3 hours 15 minutes, soak for 18 hours; Segment 4: set point 80° F. (26.6° C.), ramp down over 4 hours 27 minutes, soak for 5 minutes), the dimensions of the final cut-off wheels were 104.03-104.76 mm×1.34-1.63 mm×9.5 mm.

The cut-off wheels were tested on a Matermini cut test machine, model PTA 100/230, from Davide Matemini SPA of Malnate, Italy) fitted with a 230V 4-inch Bosch grinder model GWS 6-100 (nominal rpm 10,000). The cut test machine was used at the following parameters: test program 100-SS-R, cutting current: 3.5 A, Factor kp=15, Factor kd=30. The work pieces were 16 mm solid stainless steel rods. Both the average cut time and the number of cuts were recorded until the cut-off wheels reached a diameter of 90 mm. Results are reported in Table 4.

Examples 2 and 3 and Comparative Examples A-B were prepared identically to Example 1, except for the composition changes as shown in Table 3.

Comparative test results are shown in Table 4 for average time per cut and number of cuts achieved before the wheel was consumed.

Examples 4-6 and Comparative Examples C-D

Examples 4-6 and Comparative Examples C and D were prepared identically to Example 1, except for compositional changes as indicated in Table 3.

The surface treatment was applied by pouring an 85° C. solution of 15 grams WG in 1375 grams deionized water over 1625 grams of abrasive particles in a Buchner funnel. The mineral was then dried at 100° C. for 2-3 hours. The particles were then sieved to remove clumps. Then, a solution of 3 grams CA in 75 grams of isopropyl alcohol and 500 grams deionized water was poured over 1500 grams of the pretreated abrasive particles in a glass jar with stirring. The jar was covered (not sealed) and placed in an oven at 100° C. for 4 hours. The jar covers were then removed to allow the particles to dry in the oven.

Examples 7-10 and Comparative Examples E-G

Examples 7-10 and Comparative Examples F-H were prepared identically to Example 1, except for the compositional changes reported in Table 3.

Examples 11-12 and Comparative Examples H-J

Examples 11-12 and Comparative Examples H-J were prepared identically to Example 1, except for the compositional changes reported in Table 3.

Examples 13-14

Examples 13-14 were prepared identically to Example 1, except for the addition of APR.

In Table 3 (below), abrasive particles marked with an asterisk (*) were pretreated with CA prior to mixing with resin using a procedure generally as described in Example 4.

TABLE 3

| EXAMPLE | ABRASIVE PARTICLES, parts by weight | | | | | | | | | | | | | | |
|---|---|---|---|---|---|---|---|---|---|---|---|---|---|---|---|
| | SAL0 | SAL1 | SAL2 | SAL3 | AL0 | AL1 | AL2 | AL3 | AL4 | PR1 | PR2 | PR3 | CRY | SR | APR |
| Comparative Example A | | | | | | 27.3 | 27.05 | 4.7 | 3.1 | 5.5 | 17.25 | | 15.1 | 1.1 | |
| Comparative Example B | 54.35 | | | | | | | 4.7 | 3.1 | 5.5 | 17.25 | | 15.1 | 1.1 | |
| 1 | | 54.35 | | | | | | 4.7 | 3.1 | 5.5 | 17.25 | | 15.1 | 1.1 | |
| 2 | | | 54.35 | | | | | 4.7 | 3.1 | 5.5 | 17.25 | | 15.1 | 1.1 | |
| 3 | | | | 54.35 | | | | 4.7 | 3.1 | 5.5 | 17.25 | | 15.1 | 1.1 | |
| Comparative Example C | | | | | | 27.3* | 27.05* | 4.7 | 3.1 | 5.5 | 17.25 | | 15.1 | 1.1 | |
| Comparative Example D | 54.35* | | | | | | | 4.7 | 3.1 | 5.5 | 17.25 | | 15.1 | 1.1 | |
| 4 | | 54.35* | | | | | | 4.7 | 3.1 | 5.5 | 17.25 | | 15.1 | 1.1 | |
| 5 | | | 54.35* | | | | | 4.7 | 3.1 | 5.5 | 17.25 | | 15.1 | 1.1 | |
| 6 | | | | 54.35* | | | | 4.7 | 3.1 | 5.5 | 17.25 | | 15.1 | 1.1 | |
| Comparative Example E | 21.74 | | | | 32.61 | | | 4.7 | 3.1 | 5.5 | 17.25 | | 15.1 | 1.1 | |
| Comparative Example F | 32.61 | | | | 21.74 | | | 4.7 | 3.1 | 5.5 | 17.25 | | 15.1 | 1.1 | |
| Comparative Example G | 43.48 | | | | 10.87 | | | 4.7 | 3.1 | 5.5 | 17.25 | | 15.1 | 1.1 | |
| 7 | | 10.87 | | | 43.48 | | | 4.7 | 3.1 | 5.5 | 17.25 | | 15.1 | 1.1 | |
| 8 | | 21.74 | | | 32.61 | | | 4.7 | 3.1 | 5.5 | 17.25 | | 15.1 | 1.1 | |
| 9 | | 32.61 | | | 21.74 | | | 4.7 | 3.1 | 5.5 | 17.25 | | 15.1 | 1.1 | |
| 10 | | 43.48 | | | 10.87 | | | 4.7 | 3.1 | 5.5 | 17.25 | | 15.1 | 1.1 | |
| Comparative Example H | | | | | 54.35 | | | 4.7 | 3.1 | 5.5 | 0 | 17.25 | 15.1 | 1.1 | |
| Comparative Example I | 54.35 | | | | | | | 4.7 | 3.1 | 5.5 | 0 | 17.25 | 15.1 | 1.1 | |
| 11 | | 54.35 | | | | | | 4.7 | 3.1 | 5.5 | 0 | 17.25 | 15.1 | 1.1 | |
| Comparative Example J | 54.35* | | | | | | | 4.7 | 3.1 | 5.5 | 0 | 17.25 | 15.1 | 1.1 | |
| 12 | | 54.35* | | | | | | 4.7 | 3.1 | 5.5 | 0 | 17.25 | 15.1 | 1.1 | |
| 13 | | 54.35 | | | | | | 4.7 | 3.1 | 5.5 | 17.25 | 0 | 15.1 | 1.1 | 0.35 |
| 14 | | 54.35* | | | | | | 4.7 | 3.1 | 5.5 | 17.25 | 0 | 15.1 | 1.1 | 0.35 |

TABLE 4

| EXAMPLE | AVERAGE RADIUS OF CURVATURE OF ABRASIVE PARTICLE SIDE EDGES, micrometers, (standard deviation) | CUT TIME, seconds | TOTAL CUTS |
|---|---|---|---|
| Comparative Example A | | 11.5 | 7 |
| Comparative Example B | 134 (31) | 8.35 | 9 |
| 1 | 13.7 (9.2) | 6.1 | 40 |
| 2 | 8.0 (3.9) | 5.4 | 29 |
| 3 | 22.7 (13.3) | 8.6 | 13 |
| Comparative Example C | | 11.8 | 6 |
| Comparative Example D | 134 (31) | 8.9 | 14 |
| 4 | 13.7 (9.2) | 6.2 | 38 |
| 5 | 8.0 (3.9) | 5.1 | 36 |
| 6 | 22.7 (13.3) | 7.9 | 24 |
| Comparative Example E | 134 (31) | 8.1 | 12 |
| Comparative Example F | 134 (31) | 8.1 | 15 |
| Comparative Example G | 134 (31) | 9.1 | 15 |
| 7 | 13.7 (9.2) | 7.8 | 12 |
| 8 | 13.7 (9.2) | 7.6 | 19 |
| 9 | 13.7 (9.2) | 6.2 | 24 |
| 10 | 13.7 (9.2) | 10.5 | 24 |
| Comparative Example H | | 8.0 | 17 |
| Comparative Example I | 134 (31) | 8.1 | 24 |
| 11 | 13.7 (9.2) | 6.7 | 38 |
| Comparative Example J | 134 (31) | 8.5 | 21 |
| 12 | 13.7 (9.2) | 6.5 | 45 |
| 13 | 13.7 (9.2) | 9.6 | 9 |
| 14 | 13.7 (9.2) | 6.3 | 41 |

Examples 15-18

Examples 15-18 demonstrate the effect of the application of a particulate surface coating treatment onto the surface of the ceramic shaped abrasive particles. Examples 15-18 were prepared as in Example 1, except the press used was a laboratory model press (PHI model no. B237-H-X4B, obtained from PHI, a division of Tulip Corporation of City of Industry, Calif.), the molding pressure used was 10 tons, and the particle compositions were as shown in Table 2. Further, in Examples 15 and 17, no SR was included in the mix. No substantial effect on the number of cuts was attributable to the application of the surface coating treatment.

TABLE 5

| EXAMPLE | PARTICLE TYPE | PARTICULATE SURFACE COATING TREATMENT? | NUMBER OF CUTS |
|---|---|---|---|
| 15 | SAL4 | No | 20, 28 |
| 16 | SAL1 | Yes | 31, 20 |
| 17 | SAL5 | No | 26, 14 |
| 18 | SAL3 | Yes | 21, 14 |

Examples 19-21

Examples 19-21 were Type 27 depressed-center grinding wheels that were selected from a lot that was prepared according to the following procedure. 4440 grams of SAL6 were mixed for 10 minutes with 200 grams of liquid resin (PA 5614 G—PA Resins AB of Perstorp, Sweden) with 5 grams of silane (DYNASILAN DamoT, Evonik Industries of Essen, Germany) in a paddle type mixer. This was Mix 1. Mix 2 was prepared by mixing 280 grams of 8551G and 8126G powder phenolic resins (Dynea Oy of Helsinki, Finland), 460 potassium aluminum fluoride (KBM Master Alloys of Delfzijl, The Netherlands), 320 grams cryolite (Solvay S. A. of Brussels, Belgium) and 8 grams of carbon black for 10 minutes in a paddle type mixer. Mix 1 and Mix 2 were then combined and mixed in a paddle type mixer for 10 minutes. Furfural alcohol and mineral oil were added during mixing to control the mix viscosity and reduce dust.

This mix was place in an open shallow container and allowed to condition at room temperature and humidity. It was then screened through a screen with 2×2 mm openings to remove agglomerates. This screened mixture was then pressed in 125 mm diameter dies. Fiberglass mesh (obtained as RXP 28 from Rymatex Sp. z.o.o. of Rymanow, Poland) was placed in the die, 82 grams of the mix above was then added, a second fiberglass mesh (RXO 38; Rymatex) was added, an additional 82 grams of the mix above was added to die and a third fiberglass mesh (RXO 38) was added. A thin paper label and a metal center hole bushing were added. This mix was then pressed at 197 kg/cm square for 12 hours.

The wheels where placed on a spindle between aluminum plates that are shaped to the European EN Standard for type 27 depressed-center grinding wheels. The stack of plates and pressed wheels were compressed at 3 atmospheres (304 kPa) to shape the wheels and then put under compression for curing. The wheels were placed in an oven to cure. The oven was heated 2 hours to 75 degrees C., 3.5 hours to 90 degrees C., 2 hours to 110 degrees C., 5 hours 135 degrees C., 3 hours to 184 degrees C., then held at 184 degrees C. for 5.5 hours. The heat was then turned off, and the oven was allowed to cool. The dimension of the final grinding wheels was 123.6 mm to 124.2 mm diameter and 5.6 to 6.3 mm thick. The center hole was 22.32 mm in diameter.

Comparative Examples K-M

Comparative Examples K-M were prepared identically to Example 19, with the exception that AL5 was substituted for SAL6

The wheels were tested by grinding for 5 minutes on a stainless steel plate 8 mm thick and 350 mm long by had using a Bosch electric right angle grinder. Weight loss of the grinding wheel and the plate were recorded after each test.

Test results for Examples 19-21 and Comparative Examples K-M are reported in Table 6 (below), wherein the weight of workpiece consumed divided by the weight of grinding wheel consumed is reported as "Weight Factor."

TABLE 6

| EXAMPLE | DISC WEIGHT BEFORE TEST, grams | WORKPIECE CONSUMPTION, grams | DISC CONSUMPTION, grams | WEIGHT FACTOR | AVERAGE WEIGHT FACTOR |
|---|---|---|---|---|---|
| 19 | 172.9 | 186.0 | 10.2 | 18.2 | 17.9 |
| 20 | 170.1 | 217.0 | 11.7 | 18.5 | |
| 21 | 170.3 | 197.0 | 11.6 | 17.0 | |
| Comparative Example K | 201.3 | 120.0 | 13.8 | 8.7 | 8.2 |
| Comparative Example L | 201.5 | 114.0 | 13.9 | 8.2 | |
| Comparative Example M | 200.2 | 138.0 | 17.6 | 7.8 | |

All patents and publications referred to herein are hereby incorporated by reference in their entirety. All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A bonded abrasive comprising ceramic shaped abrasive particles retained in a binder, wherein each of the ceramic shaped abrasive particles is respectively bounded by a polygonal base, a polygonal top substantially parallel to the base, and a plurality of sides connecting the base and the top, wherein adjacent sides meet at respective side edges having an average radius of curvature of less than 50 micrometers, wherein the bonded abrasive comprises a bonded abrasive wheel having opposed major surfaces, and wherein for a majority of the ceramic shaped abrasive particles, each respective base is aligned substantially parallel to the opposed major surfaces.

2. The bonded abrasive of claim 1, wherein each of the sides independently forms a respective dihedral angle with the base in a range of from 75 to 85 degrees.

3. The bonded abrasive of claim 1, further comprising crushed abrasive particles having a specified nominal grade.

4. The bonded abrasive of claim 3, wherein the crushed abrasive particles are of a finer abrasives industry recognized specified nominal grade than the ceramic shaped abrasive particles.

5. The bonded abrasive of claim 1, wherein the ceramic shaped abrasive particles nominally comprise truncated triangular pyramids.

6. The bonded abrasive of claim 5, wherein the ceramic shaped abrasive particles nominally comprise truncated regular triangular pyramids.

7. The bonded abrasive of claim 1, wherein the ceramic shaped abrasive particles have a ratio of maximum length to thickness of from 1:1 to 8:1.

8. The bonded abrasive of claim 7, wherein the ceramic shaped abrasive particles have a ratio of maximum length to thickness of from 2:1 to 4:1.

9. The bonded abrasive of claim 1, wherein the ceramic shaped abrasive particles comprise sol-gel derived alumina abrasive particles.

10. The bonded abrasive of claim 1, wherein the ceramic shaped abrasive particles have a coating of inorganic particles thereon.

11. The bonded abrasive of claim 1, wherein the bonded abrasive wheel comprises reinforcing material disposed on opposed major surfaces thereof.

12. The bonded abrasive of claim 1, wherein the binder comprises a phenolic resin.

13. The bonded abrasive of claim 1, wherein the bonded abrasive wheel comprises a cut-off wheel.

14. The bonded abrasive of claim 1, wherein the bonded abrasive wheel comprises a depressed-center grinding wheel.

* * * * *

UNITED STATES PATENT AND TRADEMARK OFFICE
CERTIFICATE OF CORRECTION

| | | |
|---|---|---|
| PATENT NO. | : 9,180,573 B2 | Page 1 of 1 |
| APPLICATION NO. | : 13/579533 | |
| DATED | : November 10, 2015 | |
| INVENTOR(S) | : Maiken Givot | |

It is certified that error appears in the above-identified patent and that said Letters Patent is hereby corrected as shown below:

Title page

(Attorney, Agent or Firm)
Line 1, Delete "Branford B. Wright" and insert -- Bradford B. Wright --, therefor.

Specification

Column 4
Line 47, Delete "spinet," and insert -- spinel, --, therefor.

Column 20
Line 9, Delete "Matermini" and insert -- Maternini --, therefor.

Signed and Sealed this
Fifth Day of July, 2016

Michelle K. Lee
*Director of the United States Patent and Trademark Office*